United States Patent
Milazzo

[19]

[11] Patent Number: 5,947,504
[45] Date of Patent: Sep. 7, 1999

[54] TRAILER HITCH SAFETY APPARATUS

[76] Inventor: James D. Milazzo, 13046 Gurney La., Baton Rouge, La. 70818

[21] Appl. No.: 08/819,781

[22] Filed: Mar. 18, 1997

[51] Int. Cl.[6] ........................................................ B60D 1/28
[52] U.S. Cl. ......................................... 280/457; 280/461.1
[58] Field of Search ..................................... 280/457, 459, 280/461.1, 406.1, 407, 511, 507

[56] References Cited

U.S. PATENT DOCUMENTS

| | | | |
|---|---|---|---|
| 2,586,202 | 2/1952 | Bingham | 280/507 |
| 2,738,206 | 3/1956 | Loughner | 280/507 |
| 3,326,576 | 6/1967 | Kothmann | 280/515 |
| 3,393,924 | 7/1968 | Silver | 280/461 |
| 3,479,056 | 11/1969 | Peters et al. | 280/507 |
| 3,549,173 | 12/1970 | Stanfield | 280/457 |
| 4,211,428 | 7/1980 | Barcus | 280/511 |
| 4,278,267 | 7/1981 | Vasseur | 280/406.1 |
| 4,428,596 | 1/1984 | Bell et al. | 280/507 |
| 4,774,823 | 10/1988 | Callison | 70/14 |
| 5,161,815 | 11/1992 | Penor, Jr. | 280/477 |
| 5,378,008 | 1/1995 | McCrossen | 280/507 |
| 5,476,281 | 12/1995 | Worthington | 280/507 |

*Primary Examiner*—Kevin Hurley
*Attorney, Agent, or Firm*—David L. Ray

[57] ABSTRACT

A trailer hitch safety apparatus which prevents the trailer from becoming disconnected from the towing vehicle when the trailer becomes disconnected from the primary trailer hitch. The trailer hitch safety apparatus of the invention includes a stud holding member adapted for connection to the bumper of the towing vehicle beneath the bumper and beneath the ball hitch, an elongated stud rigidly connected to the stud holding member, the stud extending downwardly from the stud holding member, a tongue member adapted for connection to the stud and to the trailer tongue, the tongue member having an elongated slot therein for receipt of the stud, and a locking device for connection to the stud after the stud is received in the elongated slot of the trailer tongue, the locking device being connected to the end of the elongated stud to provide a space between the locking device and the stud holding member for the tongue member to move upward and downward on the stud between the locking device and the stud holding member.

22 Claims, 5 Drawing Sheets

TRAILER HITCH SAFETY APPARATUS

BACKGROUND OF THE INVENTION

1. Field of the Invention

The present invention relates to trailer hitches. In particular, the invention relates to trailer hitches having locking devices for preventing the trailer from accidently disconnecting from a ball hitch on the towing vehicle.

2. Description of the Related Art

It is known in the art that trailers sometimes become accidently disconnected from the vehicle which is towing the trailer. Such accidental disconnections can cause damage to the trailer and the equipment carried thereon. Other vehicles traveling on the highway on which the trailer is being towed can be damaged by the accidently disconnected trailer, and the occupants of the other vehicles struck by the accidently disconnected trailer may suffer serious or fatal injuries.

Ball trailer hitches are usually bolted to the bumper or towing bar of the towing vehicle, and the nut holding the ball hitch to the trailer may come unthreaded from the bolt holding the ball hitch to the towing vehicle. Furthermore, the bolt holding the ball hitch to the trailer may shear off the towing vehicle.

Trailers are commonly required to have additional hitching devices such as safety chains thereon to prevent the trailer from becoming detached from the towing vehicle if the primary trailer hitch, such as a common ball hitch or the like, becomes disconnected. However, safety chains frequently break after the trailer becomes accidently separated from the primary trailer hitch. The safety chains many trailers have allow the trailer tongue to drag on the road after accidental disconnection of the ball hitch. When the trailer tongue drags on the road, the trailer tongue may hit a hole or irregularity in the road and break the safety chains or flip the trailer.

Exemplary of the Patents of the related art are the following U.S. Pat. Nos. 5,378,008; 5,161,815; 4,774,823; 4,428,596; 4,211,428; 3,549,173; 3,393,924; and 3,326,576.

SUMMARY OF THE INVENTION

In accordance with the present invention there is provided a trailer hitch safety apparatus for a towing vehicle with a bumper with a ball hitch mounted thereon and a trailer having a ball socket mounted on the tongue of the trailer for receipt of the ball hitch. The apparatus prevents the trailer from becoming disconnected from the towing vehicle when the trailer becomes disconnected from the primary trailer hitch. The trailer hitch safety apparatus of the invention includes a stud holding member adapted for connection to the bumper of the towing vehicle beneath the bumper and beneath the ball hitch, an elongated stud rigidly connected to the stud holding member, the stud extending downwardly from the stud holding member, a tongue member adapted for connection to the stud and to the trailer tongue, the tongue member having an elongated slot therein for receipt of the stud, and a locking device for connection to the stud after the stud is received in the elongated slot of the trailer tongue, the locking device being connected to the end of the elongated stud to provide a space between the locking device and the stud holding member for the tongue member to move upward and downward on the stud between the locking device and the stud holding member.

The invention has the advantage of being low in cost.

The invention has the further advantage of being quickly and easily installed on commonly used trailers.

The invention has an additional advantage of maintaining the trailer tongue of the trailer at approximately the same height above the ground even the ball hitch is loose or disconnected from the towing vehicle.

DESCRIPTION OF THE PREFERRED EMBODIMENTS

Referring now to the drawings, in FIGS. 1–3 and 8 is shown the first embodiment of the trailer hitch safety apparatus of the invention.

A conventional ball hitch generally indicated by the numeral 10 is shown connected to a conventional vehicle bumper generally indicated by the numeral 12 as is known in the art. The vehicle to which bumper 12 may be connected may be a truck, van, sport-utility vehicle, an automobile, bus, or the like.

Figure 1:
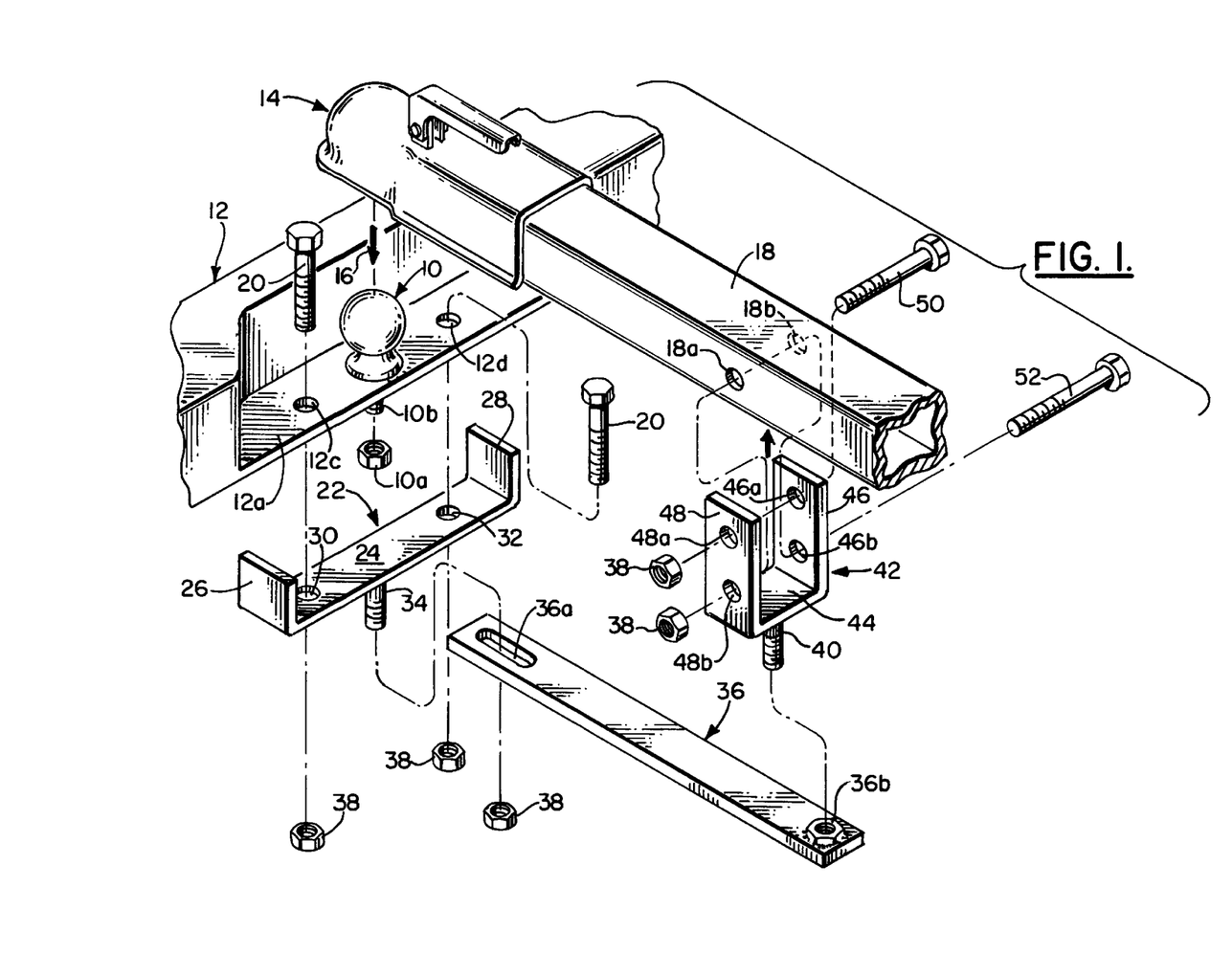
FIG. 1 is a partly cut-away, exploded, perspective of a first embodiment of the invention connected to a ball trailer hitch.
Figure 8:
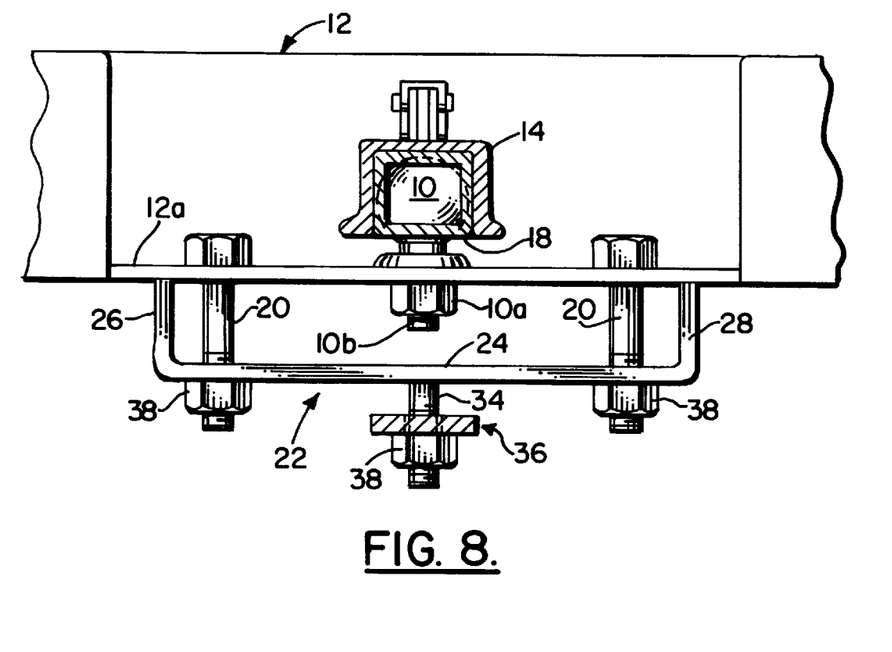
FIG. 8 is a partly cross-sectional view taken along lines 8—8 of FIG. 2.

Located immediately above ball hitch 10 in FIG. 1, and 8 is a conventional trailer ball socket generally indicated by the number 14 which is shown by arrow 16 to be aligned for placement on top of ball 10. Ball socket 14 is connected to a trailer tongue 18. Trailer tongue 18 extends backward to a conventional trailer well known in the art of any desired type such as a boat trailer, motorcycle trailer, utility trailer, or the like.

Ball hitch 10 is secured to bumper 12 by a nut 10a which connects to threaded stud 10b extending downward from ball hitch 10. Ball hitch 10 is located on a generally rectangular plate section 12a of bumper 12 which contains a channel (not shown) therein for receipt of threaded stud 10b. Bumper 12 and ball hitch 10a are conventional and well known in the art.

In accordance with the first embodiment of the present invention, there are provided on either side of ball hitch 10 two channels 12c and 12d in plate 12a which receive bolts 20—20. A U-shaped member generally indicated by the numeral 22 is located beneath bumper 12 and beneath ball hitch 10.

U-shaped member 22 includes a flat rectangular horizontal plate 24 having two flat rectangular side plates 26 and 28 extending perpendicularly upward therefrom. U-shaped member 22 has two channels 30 and 32 therein for receipt of bolts 20—20 having nuts 38—38 thereon to secure U-shaped member 22 to the bottom of plate 12a of bumper 12.

Extending downward from the bottom side of plate 24 of U-shaped member 22 is a bolt or threaded stud 34. Stud 34 is preferably rigidly connected to the bottom of plate 24 by welding or the like. Stud 34 is located in the approximate center of U-shaped member 22 and is preferably aligned with threaded stud 10b of ball hitch 10.

A tongue member generally indicated by the numeral 36 has a slot 36a therein for receipt of stud 34. Tongue member 36 is an elongated generally rectangular member which has a nut 36b welded to the top side thereof welded thereto. Nut 38 is connected to stud 34 to hold stud 34 in slot 36a and to secure tongue member 36 to stud member 34.

Figure 2:
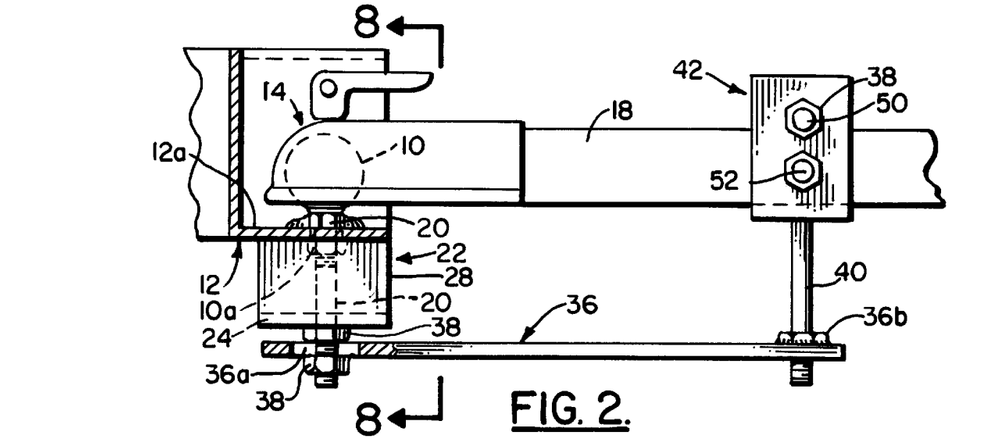
FIG. 2 is a side, elevational view of the first embodiment of the invention.
Figure 3:
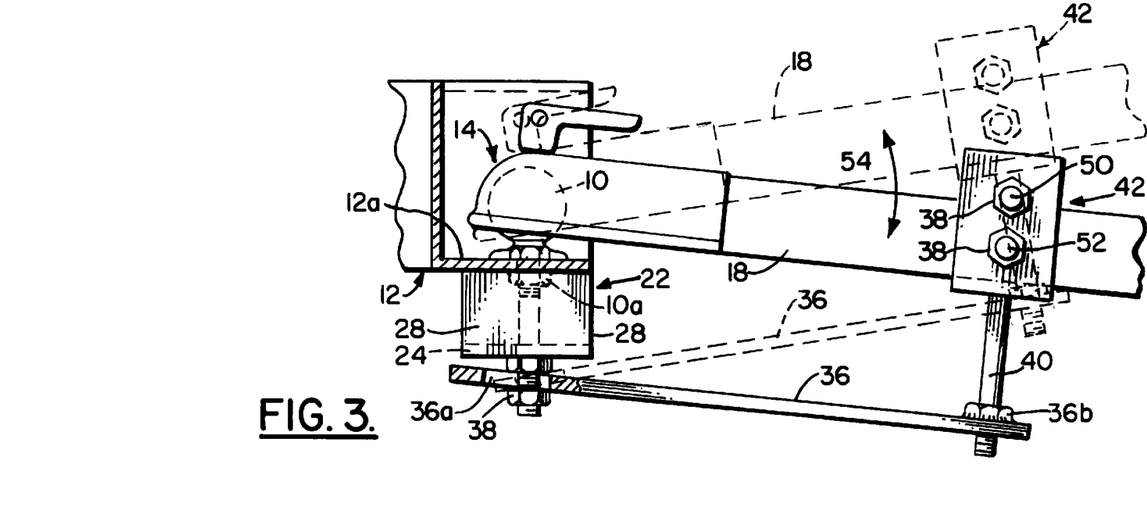
FIG. 3 is a side, elevational view of the first embodiment of the invention utilizing phantom lines to show the invention tilting about a ball trailer hitch.

As shown in FIGS. 2 and 3, a U-shaped bracket generally indicated by the numeral 42 has a stud 40 rigidly connected thereto by welding or the like. U-shaped bracket 42 has a generally rectangular base 44 having perpendicular, parallel rectangular sides 46 and 48 extending upwardly therefrom. Sides 46 and 48 each have two channels 46a and 46b, and 48a and 48b, respectively, for receipt of bolts 50 and 52, respectively. Trailer tongue 18 has two channels 18a and 18b therein for receipt of bolt 52. Bolts 50 and 52 have nuts 38 connected thereto. The two channels 18a and 18b are located on trailer tongue 18 so that stud 40 is in alignment with nut 36b on tongue member 36.

To assemble the trailer hitch safety apparatus of the first embodiment of the invention shown in FIGS. 1–3 and 8, the U-shaped member 22 is bolted to the bottom of plate 12a of bumper 12 by placing bolts 20 through plate 12a and through channels 30 and 32 of U-shaped member 22. Nuts 38 are then screwed thereon to attach U-shaped member to bumper 12.

U-shaped bracket 42 is then aligned with nut 36b on tongue member 36 and bracket 42 is rotated to thread stud 40 into nut 36b. Stud 34 is then placed in slot 36a and nut 38 is threaded thereon.

U-shaped bracket 42 is then aligned with tongue 18 and placed thereon with stud 40 pointing downward and bolt channels 18a and 18b are aligned with channels 46b and 48b. Bolt 52 is then placed through channels 46b, 18b, 18a, and channel 48b, and nut 38 is threaded onto bolt 52. Bolt 50 is then placed through channel 46a and channel 48a, and nut 38 is threaded thereon.

The trailer tongue 18 is now locked in place by the safety apparatus of the present invention and the trailer will not be lost even if the ball hitch 10 were to come unscrewed and disconnected from bumper 12. As can be seen in FIGS. 1–3, slot 36a is an elongated, generally rectangular slot which is sufficiently long enough to permit trailer tongue 18 and tongue member 36 to move upwardly and downward as shown in FIG. 3 by the two headed arrow 54. Furthermore, stud 34 is not threaded completely up to plate 12a to provide a space above nut 38 on stud 34 and the bottom of plate 12a, as shown in FIGS. 3 and 8, sufficiently large enough to enable trailer tongue 18 and tongue member 36 to move upwardly and downward on stud 34 as shown in FIG. 3 by the two headed arrow 54. If desired, the threads on stud 34 could be eliminated and replaced with a hole or channel for insertion of a pin in the outer end of stud 34 where the threads were located. The pin or nut on the end of stud 34 lock tongue member 36 on stud 34.

U-shaped member 22 can be permanently connected to the bumper 12 and left thereon since it does not interfere with operation of the vehicle to which member 12 is attached.

To disconnect the safety apparatus of the first embodiment of the invention prior to disconnecting the trailer from the vehicle, it is only necessary to remove nut 38 from bolts 20. Trailer tongue 18 can then be lifted from ball hitch 10 to release the trailer from the vehicle.

Thus the first embodiment of the invention provides a simple and inexpensive trailer hitch safety apparatus which will prevent a trailer from becoming disconnected to vehicle even if the ball hitch is loosened or falls off the trailer.

Figure 4:
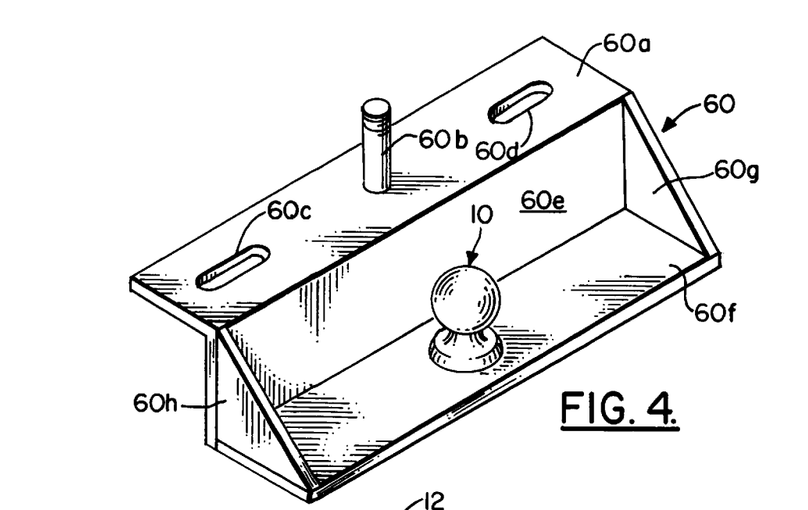
FIG. 4 is a perspective view of the bumper of a towing vehicle modified to connect a second embodiment of the invention thereto.
Figure 5:
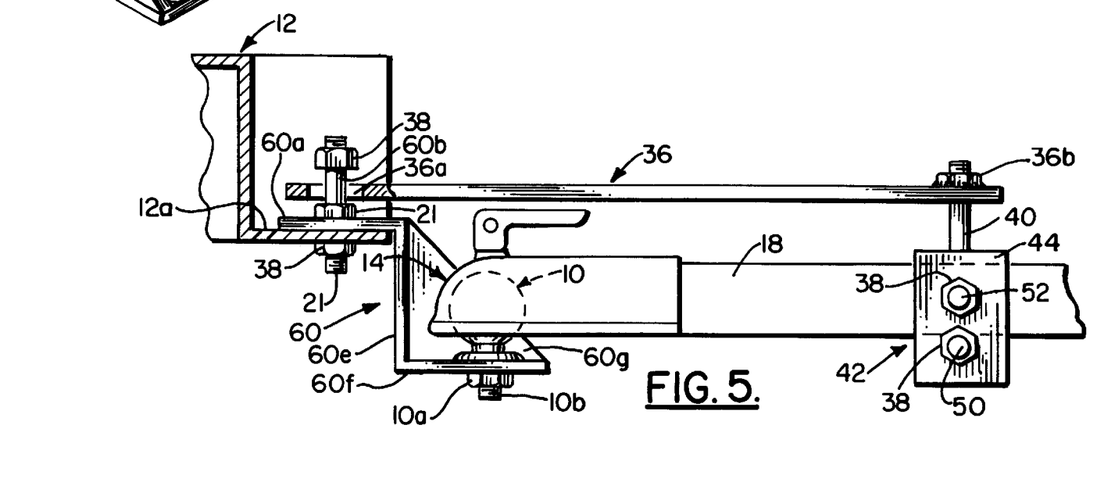
FIG. 5 is an elevational view, partly cross-sectional, partly cut-away, of the second embodiment of the invention.

Referring now to the drawings, in FIGS. 4–5 is shown the second embodiment of the trailer hitch safety apparatus of the invention. The second embodiment of the invention utilizes a step member generally indicated by the numeral 60 which is bolted to bumper 12 as shown in FIG. 5. Step member 60 lowers the height of ball hitch 10, which is sometimes necessary to position the trailer tongue more closely to the horizontal when towed by a truck or other vehicle having a bumper 12 which is significantly higher from the ground than the height of the trailer tongue of the trailer when the trailer tongue is aligned horizontally. High bumpers 12 are commonly encountered when large or oversize tires are placed on trucks and other vehicles. Large heavy duty trucks also have relatively high bumpers and require a device to lower the height of the bumper 12 to connect to a trailer and maintain the trailer tongue in an approximately horizontal position.

Step member 60 includes a horizontal top flat plate 60a having a stud 60b extending approximately perpendicularly upwardly therefrom, and two preferably elongated channel 60c and 60d for receipt of bolts 21—21 extending completely therethrough. Step member 60 has a vertical flat plate 60e rigidly connected perpendicularly to horizontal top plate 60a by welding or the like. Stud 60b is not threaded completely down to plate 60a to provide a space beneath nut 38 on stud 60b and the top of plate 60a sufficiently large enough to enable trailer tongue 18 and tongue member 36 to move upward and downward on stud 60b when trailer tongue 18 moves upward and downward in a similar manner as shown for the first embodiment of the invention shown in FIG. 3. If desired, the threads on stud 34 could be eliminated and replaced with a hole or channel for insertion of a pin in the outer end of stud 34 where the threads were located. The pin or nut on the end of stud 60b lock tongue member 36 on stud 60b.

A horizontal bottom flat plate 60f is rigidly connected to vertical flat plate 60e by welding or the like. Two triangular plates 60g and 60h connect the edges of vertical plate 60a and bottom horizontal plate 60f to provide additional strength and support for bottom plate 60f. Connected to bottom plate 60f is ball hitch 10 shown in FIGS. 4 and 5 is identical to ball hitch 10 shown FIG. 1 and has the appropriate threaded stud 10b extending therefrom. Ball hitch 10 shown in FIGS. 4 and 5 is connected to flat horizontal bottom portion 60f of step member 60 by threaded stud 10b and nut 10a.

U-shaped bracket 42 is connected to trailer tongue 18 shown in FIG. 5 which is identical to trailer tongue 18 shown in FIG. 1. U-shaped bracket 42 is shown rotated 180 degrees on trailer tongue 18 from the position shown in FIGS. 1, 2 and 3. Stud 40 is extends vertically upward from base 44 of bracket 42 and is screwed into nut 36b of tongue member 36. Tongue member 36 has slot 36a therein which is elongated slot identical to slot to 36a shown in FIG. 1, 2 and 3. Stud 60b is received in slot 36a and nut 38 is threaded onto stud 60b to hold tongue member 36a on stud 60b.

To connect the trailer hitch safety apparatus of the second embodiment of the invention to bumper 12 as shown in FIG.

5, the step member 60 is bolted to the flat portion 12a of bumper 12 by inserting bolts 21—21 through slots 60c and 60d into channels 12c and 12d of bumper 12. Bolts 21—21 are secured to flat portion 12a of bumper 12 by nuts 38—38. Trailer ball socket 14 is then placed over trailer ball hitch 10 and secured thereto.

U-shaped bracket 42 is then aligned with tongue 18 above tongue 18 and placed thereon with stud 40 pointing upward and bolt channels 18a and 18b are aligned with channels 46b and 48b. Bolt 52 is then placed through channels 46b, 18b, 18a, and channel 48b, and nut 38 is threaded onto bolt 52. Bolt 50 is then placed through channel 46a and channel 48a, and nut 38 is threaded thereon.

As shown in FIG. 5, the trailer tongue 18 is now locked in place by the second embodiment of safety apparatus of the present invention and the trailer will not be lost even if the ball hitch 10 were to come unscrewed and disconnected from bumper 12.

Step member 60 can be permanently connected to the bumper 12 and left thereon since it does not interfere with operation of the vehicle to which member 60 is attached.

To disconnect the safety apparatus of the second embodiment invention prior to disconnecting the trailer from the vehicle, it is only necessary to remove nut 38 from stud 60b. Trailer tongue 18 can then be lifted from ball hitch 10 in the conventional manner to release the trailer from the vehicle.

Thus the second embodiment of the invention provides a simple and inexpensive trailer hitch safety apparatus which will prevent a trailer from becoming disconnected to vehicle even if the ball hitch is loosened or falls off the trailer.

Figure 6:
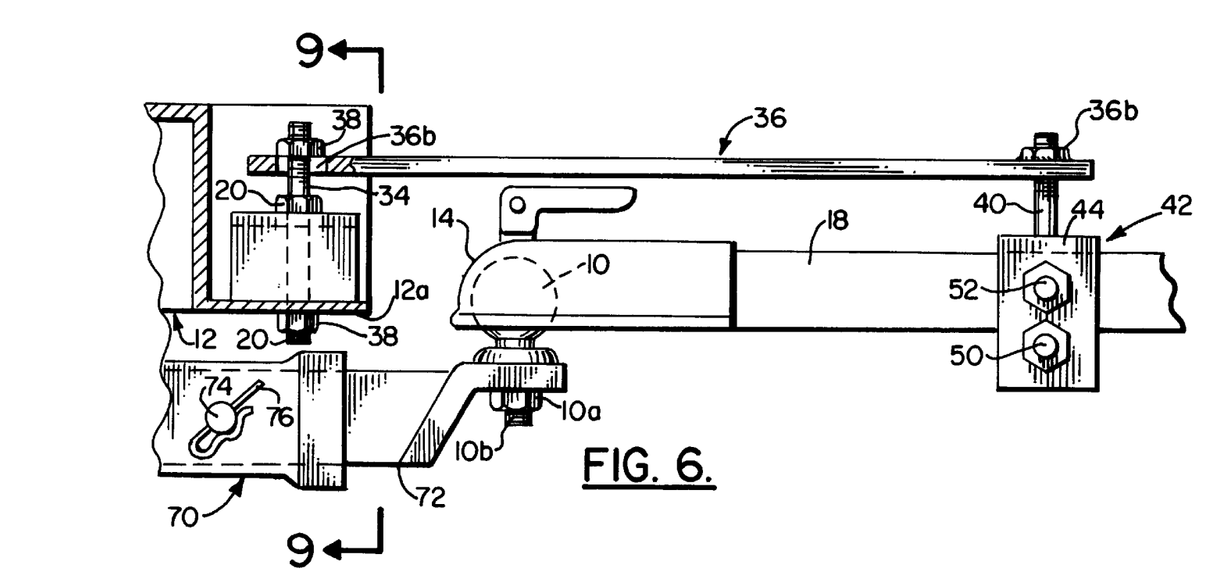
FIG. 6 is an elevational view, partly cross-sectional, partly cut-away, of a third embodiment of the invention.
Figure 9:
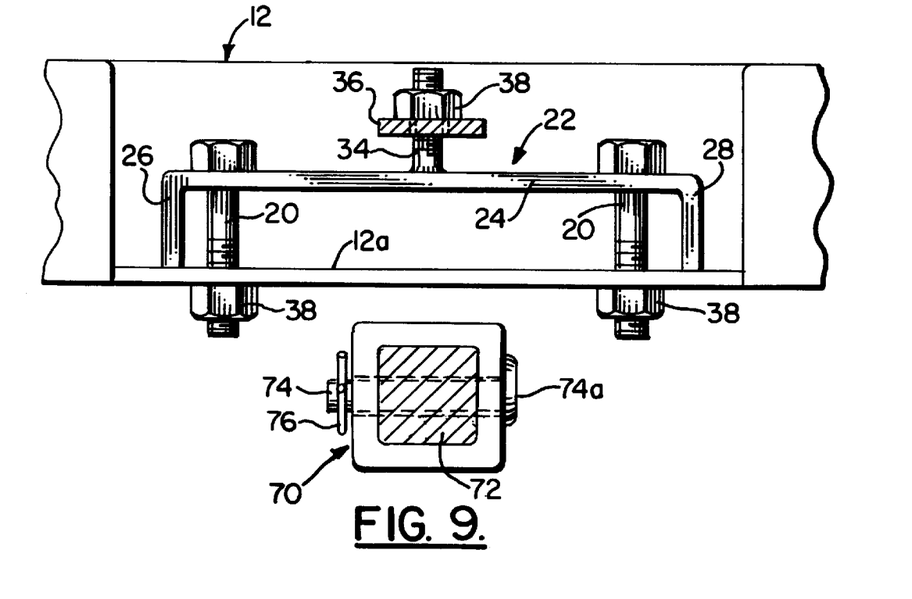
FIG. 9 is a partly cross-sectional view taken along lines 9—9 of FIG. 6.

Referring now to FIGS. 6 and 9, there is shown the third embodiment of the trailer hitch safety apparatus of the invention which is utilized with a frame hitch generally indicated by the numeral 70. Frame hitches such as frame hitch 70 are well known in the art and are commonly used to tow heavier trailers than the trailers towed by bumper- or step-mounted hitches as shown in FIGS. 1 and 5. Frame hitches such as frame hitch 70 are connected to the frame of the towing vehicle as is well known in the art.

As shown in FIGS. 6 and 9, frame hitch 70 is connected to the frame of the towing vehicle to which bumper 12 shown in FIGS. 6 and 9 is connected. Frame hitch 70 is hollow and has a generally rectangular cross-section. A solid removable hitch bar 72 is slidably received in frame hitch 70 and is connected to frame hitch 70 by pin 74. Pin 74 has enlarged head 74a thereon and is secured to frame hitch 70 by cotter key 76. Ball hitch 10 is connected to the outer end of hitch bar 72 by threaded stud 10a and nut 38.

As shown in FIGS. 6 and 9, there are provided two channels (not shown), which are identical to channels 12c and 12d shown in FIG. 1, in flat section 12a which receive bolts 20—20. A U-shaped member generally indicated by the numeral 22, which is identical to U-shaped member 22 in FIG. 1, is connected to the top of flat section 12a of bumper 12.

U-shaped member 22 includes a flat rectangular horizontal plate 24 having two flat rectangular side plates 26 and 28 extending perpendicularly therefrom. U-shaped member 22 has two channels (not shown) identical to channels 30 and 32 shown in FIG. 1 for receipt of bolts 20—20 having nuts 38—38 threaded thereon to secure U-shaped member 22 to the top of flat section 12a of bumper 12.

Extending upward from the top side of plate 24 of U-shaped member 22 is threaded stud 34 which is identical to threaded stud 34 shown in FIG. 1. Stud 34 is rigidly connected to the bottom of bottom plate 24 by welding or the like. Stud 34 is located in the approximate center of U-shaped member 22.

Tongue member generally indicated by the numeral 36 is identical to tongue member 36 shown in the first embodiment of the invention and has a slot 36a therein for receipt of stud 34. Nut 38 is connected to stud 34 to hold stud 34 in slot 36a and to secure tongue member 36 to stud 34.

U-shaped bracket 42 is identical to the U-shaped bracket described in the first and second embodiment of the invention and has a stud 40 rigidly connected thereto by welding or the like. U-shaped bracket 42 has a base 44 having perpendicular, parallel rectangular sides 46 and 48 extending upwardly therefrom. Sides 46 and 48 each have two channels 46a and 46b, and 48a and 48b, respectively, for receipt of bolts 50 and 52. Trailer tongue 18 has two channels 18a and 18b therein for receipt of bolt 52. Bolts 50 and 52 have nuts 38 connected thereto. The two channels 18a and 18b are located on trailer tongue 18 so that stud 40 is in alignment with nut 36b on tongue member 36.

The third embodiment of the invention is connected and disconnected from bumper 12 and ball hitch 10 in the same manner as the second embodiment of the invention described above.

Figure 7:
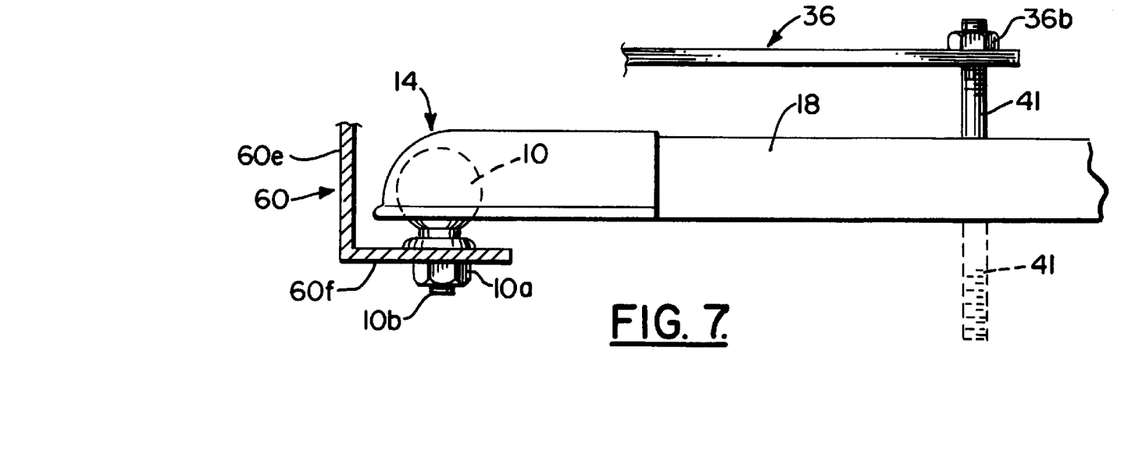
FIG. 7 is an elevational view, partly cross-sectional, partly cut-away, of a fourth embodiment of the invention.

Referring now to FIG. 7, there is shown the fourth embodiment of the trailer hitch safety apparatus of the invention wherein bracket 42 is eliminated and stud 41 is rigidly connected to trailer tongue 18 by welding, bolting, or the like. Stud 41 has the same length of threads thereon as stud 40 and can replace bracket 42 in the first, second, and third embodiments. As shown in phantom lines in FIG. 7, stud 41 can be also be rigidly connected to the bottom of trailer tongue 18.

The various components of all of the embodiments of the invention are preferably made from a rigid metal such as steel and its various alloys and have sufficient strength and rigidity to support trailer tongue 18 in the position shown in the drawings even when ball hitch 10 is accidently removed.

While the present invention has been described in relation to a trailer, the invention could be used in towing other vehicles such as a wagon, or the like.

Although the preferred embodiments of the invention have been described in detail above, it should be understood that the invention is in no sense limited thereby, and its scope is to be determined by that of the following claims:

What is claimed is:

1. A trailer hitch safety apparatus for a towing vehicle with a bumper with a ball hitch mounted on a flat horizontal portion of said bumper and a trailer having a ball socket mounted on the tongue of the trailer for receipt of said ball hitch, the trailer hitch safety apparatus comprising:

a. a U-shaped stud holding member adapted for connection to said flat horizontal portion of said bumper of said towing vehicle, said stud holding member having a flat horizontal plate, b. an elongated stud having two ends, one of said two ends being rigidly connected to said flat horizontal plate of said stud holding member, said stud extending perpendicularly from said stud holding member, c. a tongue member adapted for connection to said stud and to said trailer tongue, said tongue member having an elongated slot therein for receipt of said stud, and d. a locking device for connection to said stud after said stud is received in said elongated slot of said trailer tongue, said locking device being connected to the end of said elongated stud to provide a space between said locking device and said stud holding member for said tongue member to move upward and downward on said stud between said locking device and said stud holding member.

2. The apparatus of claim 1 wherein said stud holding member is adapted for connection to the top of said flat horizontal portion of said bumper.

3. The apparatus of claim 1 wherein said stud holding member is adapted for connection to the bottom of said flat horizontal portion of said bumper.

4. The apparatus of claim 1 wherein said stud is threaded.

5. The apparatus of claim 4 wherein said locking device is a nut.

6. The apparatus of claim 1 wherein said tongue member has a bracket having a stud extending therefrom for connecting said tongue member to said tongue of said trailer.

7. The apparatus of claim 1 wherein said tongue member has a stud rigidly connected thereto for connecting said tongue member to said tongue of said trailer.

8. A trailer hitch safety apparatus for a towing vehicle with a bumper with a flat horizontal portion thereon adapted for connecting a ball hitch thereto and a trailer having a ball socket mounted on the tongue of the trailer for receipt of a ball hitch, the trailer hitch safety apparatus comprising:

a. a step member adapted for lowering the height of said ball hitch, said step member having a horizontal top plate adapted for connection to said flat horizontal portion of said bumper and a bottom horizontal plate having a ball hitch connected thereto, b. an elongated stud having two ends, one of said two ends being rigidly connected to the top side of said horizontal top plate of said step member, said stud extending upward from said top plate, c. a tongue member adapted for connection to said stud and to said trailer tongue, said tongue member having an elongated slot therein for receipt of said stud, and d. a locking device for connection to said stud after said stud is received in said elongated slot of said trailer tongue, said locking device being connected to the end of said elongated stud to provide a space between said locking device and said top plate for said tongue member to move upward and downward on said stud between said locking device and said stud holding member.

9. The apparatus of claim 8 wherein said tongue member has a bracket having a stud extending therefrom for connecting said tongue member to said tongue of said trailer.

10. The apparatus of claim 8 wherein said stud is threaded.

11. The apparatus of claim 10 wherein said locking device is a nut.

12. The apparatus of claim 8 wherein said tongue member has a stud rigidly connected thereto for connecting said tongue member to said tongue of said trailer.

13. A trailer hitch safety apparatus for a towing vehicle with a bumper with a flat horizontal portion thereon adapted for connecting a ball hitch thereto, a frame trailer hitch for connecting a ball thereto, and a trailer having a ball socket mounted on the tongue of the trailer for receipt of a ball hitch, the trailer hitch safety apparatus comprising:

a. a U-shaped stud holding member adapted for connection to said flat horizontal portion of said bumper of said towing vehicle, said stud holding member having a flat horizontal plate, b. an elongated stud having two ends, one of said two ends being rigidly connected to said flat horizontal plate of said stud holding member, said stud extending perpendicularly from said stud holding member, c. a tongue member adapted for connection to said stud and to said trailer tongue, said tongue member having an elongated slot therein for receipt of said stud, and d. a locking device for connection to said stud after said stud is received in said elongated slot of said trailer tongue, said locking device being connected to the end of said elongated stud to provide a space between said locking device and said stud holding member for said tongue member to move upward and downward on said stud between said locking device and said stud holding member.

14. The apparatus of claim 13 wherein said tongue member has a bracket having a stud extending therefrom for connecting said tongue member to said tongue of said trailer.

15. The apparatus of claim 13 wherein said stud holding member is adapted for connection to the top of said flat horizontal portion of said bumper.

16. The apparatus of claim 13 wherein said tongue member has a stud rigidly connected thereto for connecting said tongue member to said tongue of said trailer.

17. The apparatus of claim 13 wherein said stud is threaded.

18. The apparatus of claim 17 wherein said locking device is a nut.

19. A trailer hitch safety apparatus for a towing vehicle with a bumper with a ball hitch mounted on a flat horizontal portion of said bumper and a trailer having a ball socket mounted on the tongue of the trailer for receipt of said ball hitch, the trailer hitch safety apparatus comprising:

a. a stud holding member adapted for connection to said flat horizontal portion of said bumper of said towing vehicle, said stud holding member having a flat horizontal plate, b. an elongated stud having two ends, one of said two ends being rigidly connected to said flat horizontal plate of said stud holding member, said stud extending perpendicularly from said stud holding member, c. a tongue member adapted for connection to said stud and to said trailer tongue, said tongue member having an elongated slot therein for receipt of said stud, said tongue member having a bracket having a stud extending therefrom for connecting said tongue member to said tongue of said trailer, and d. a locking device for connection to said stud after said stud is received in said elongated slot of said trailer tongue, said locking device being connected to the end of said elongated stud to provide a space between said locking device and said stud holding member for said tongue member to move upward and downward on said stud between said locking device and said stud holding member.

20. A trailer hitch safety apparatus for a towing vehicle with a bumper with a ball hitch mounted on a flat horizontal portion of said bumper and a trailer having a ball socket mounted on the tongue of the trailer for receipt of said ball hitch, the trailer hitch safety apparatus comprising:

a. a stud holding member adapted for connection to said flat horizontal portion of said bumper of said towing vehicle, said stud holding member having a flat horizontal plate, b. an elongated stud having two ends, one of said two ends being rigidly connected to said flat horizontal plate of said stud holding member, said stud extending perpendicularly from said stud holding member, c. a tongue member adapted for connection to said stud and to said trailer tongue, said tongue member having an elongated slot therein for receipt of said stud, said tongue member having a stud rigidly connected thereto for connecting said tongue member to said tongue of said trailer, and d. a locking device for connection to said stud after said stud is received in said elongated slot of said trailer tongue, said locking device being connected to the end of said elongated stud to provide a space between said locking device and said stud holding member for said tongue member to move upward and downward on said stud between said locking device and said stud holding member.

21. A trailer hitch safety apparatus for a towing vehicle with a bumper with a flat horizontal portion thereon adapted for connecting a ball hitch thereto, a frame trailer hitch for connecting a ball thereto, and a trailer having a ball socket mounted on the tongue of the trailer for receipt of a ball hitch, the trailer hitch safety apparatus comprising:

a. a stud holding member adapted for connection to said flat horizontal portion of said bumper of said towing vehicle, said stud holding member having a flat horizontal plate, b. an elongated stud having two ends, one of said two ends being rigidly connected to said flat horizontal plate of said stud holding member, said stud extending perpendicularly from said stud holding member, c. a tongue member adapted for connection to said stud and to said trailer tongue, said tongue member having an elongated slot therein for receipt of said stud, said tongue member having a bracket having a stud extending therefrom for connecting said tongue member to said tongue of said trailer, and d. a locking device for connection to said stud after said stud is received in said elongated slot of said trailer tongue, said locking device being connected to the end of said elongated stud to provide a space between said locking device and said stud holding member for said tongue member to move upward and downward on said stud between said locking device and said stud holding member.

22. A trailer hitch safety apparatus for a towing vehicle with a bumper with a flat horizontal portion thereon adapted for connecting a ball hitch thereto, a frame trailer hitch for connecting a ball thereto, and a trailer having a ball socket mounted on the tongue of the trailer for receipt of a ball hitch, the trailer hitch safety apparatus comprising:

a. a stud holding member adapted for connection to said flat horizontal portion of said bumper of said towing vehicle, said stud holding member having a flat horizontal plate, b. an elongated stud having two ends, one of said two ends being rigidly connected to said flat horizontal plate of said stud holding member, said stud extending perpendicularly from said stud holding member, c. a tongue member adapted for connection to said stud and to said trailer tongue, said tongue member having an elongated slot therein for receipt of said stud, said tongue member having a stud rigidly connected thereto for connecting said tongue member to said tongue of said trailer, and d. a locking device for connection to said stud after said stud is received in said elongated slot of said trailer tongue, said locking device being connected to the end of said elongated stud to provide a space between said locking device and said stud holding member for said tongue member to move upward and downward on said stud between said locking device and said stud holding member.

* * * * *